(12) United States Patent
Ichikawa

(10) Patent No.: US 7,534,161 B2
(45) Date of Patent: May 19, 2009

(54) METHOD FOR MANUFACTURING CELL STRUCTURE

(75) Inventor: Yukihito Ichikawa, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 90 days.

(21) Appl. No.: 11/714,096

(22) Filed: Mar. 6, 2007

(65) Prior Publication Data

US 2007/0218813 A1 Sep. 20, 2007

(30) Foreign Application Priority Data

Mar. 17, 2006 (JP) .............................. 2006-074894
Feb. 13, 2007 (JP) .............................. 2007-031736

(51) Int. Cl.
B24B 1/00 (2006.01)

(52) U.S. Cl. .......................................... 451/28; 451/54

(58) Field of Classification Search ................... 451/28, 451/54, 8
See application file for complete search history.

(56) References Cited

U.S. PATENT DOCUMENTS

| | | | | |
|---|---|---|---|---|
| 4,283,998 A | * | 8/1981 | Greve et al. ..................... | 493/4 |
| 5,425,834 A | * | 6/1995 | Shinohara et al. ............ | 156/360 |
| 6,508,852 B1 | * | 1/2003 | Hickman et al. ............... | 55/523 |
| 6,872,352 B2 | * | 3/2005 | Hernandez et al. ........... | 264/442 |
| 7,278,330 B2 | * | 10/2007 | Iwabuchi et al. ............... | 73/866 |
| 2004/0166035 A1 | | 8/2004 | Noda et al. | |
| 2005/0217395 A1 | * | 10/2005 | Iwabuchi et al. ........... | 73/865.8 |
| 2006/0029526 A1 | * | 2/2006 | Watanabe et al. ............ | 422/177 |
| 2006/0150598 A1 | * | 7/2006 | Ichikawa et al. .............. | 55/523 |
| 2007/0004593 A1 | * | 1/2007 | Ohno et al. .................. | 502/439 |
| 2007/0184241 A1 | * | 8/2007 | Ichikawa .................... | 428/117 |

FOREIGN PATENT DOCUMENTS

| | | | |
|---|---|---|---|
| EP | 1142619 A1 | * | 10/2001 |
| JP | A-2003-033664 | | 2/2003 |
| JP | A-2003-205246 | | 7/2003 |
| WO | WO 2005075075 A1 | * | 8/2005 |

* cited by examiner

Primary Examiner—Maurina Rachuba
(74) Attorney, Agent, or Firm—Oliff & Berridge, PLC (57) ABSTRACT

There is provided a method for manufacturing cell structures having a plurality of cells divided by porous partition walls and extending from one end face to the other end face to function as fluid passages. Dry mass of each of a plurality of honeycomb-shaped cell structure precursors is measured, and at least one end face of each of the cell structure precursors is subjected to machining according to the dry mass measured to obtain a plurality of cell structures having a uniform dry mass. The method can suppress excessive use of a catalyst component to reduce production costs and uniformalize the amount of a catalyst component carried on the structures.

6 Claims, 5 Drawing Sheets

WHOLE LENGTH (mm) BEFORE MACHINING END FACE

FIG.9

METHOD FOR MANUFACTURING CELL STRUCTURE

BACKGROUND OF THE INVENTION AND RELATED ART STATEMENT

The present invention relates to a method for manufacturing a cell structure suitable for a catalyst carrier.

At present, as a catalyst body for purifying automobile exhaust gas, there is used a catalyst body prepared by carrying a noble metal such as platinum (Pt), palladium (Pd), and Rhodium (Rh) as a catalyst component on a honeycomb-shaped ceramic catalyst carrier, which is a kind of porous cell structure (see, e.g., JP-A-2003-205246 and JP-A-2003-33664).

In order to manufacture such a catalyst body, it is important to set up and adjust carrying conditions so that the amount of a catalyst component carried may be appropriate. When the amount of a catalyst component carried is too little, sufficient exhaust gas purification performance or durability cannot be obtained. On the other hand, when the amount of catalyst component carried is excessive, the catalyst component such as Pt, Pd, and Rh, which are expensive and rare noble metals, is wasted to increase production costs.

A catalyst component is carried on a porous cell structure generally by a wash-coat method. Specifically, first, catalyst slurry containing a catalyst component and water is filled into a cell structure. Then, water in the catalyst slurry is absorbed by the pores of the partition walls, and the catalyst component, which is a solid component in the catalyst slurry, adheres to a surface of the partition walls and the inside of the pores opening on a surface of the partition walls by the water-absorbing power. At this time, the amount of the catalyst carrier carried can be considered to be in proportion to the water-absorption amount of the cell structure.

In order to carry a catalyst component on a plurality of cell structures, one is arbitrarily selected from the cell structures, and conditions for wash-coating are set up on the basis of partition wall thickness, pore properties, and the like, of the selected cell structure. Then, a plurality of cell structures are uniformly subjected to wash-coating according to the conditions set up above to carry a catalyst component on the cell structures.

However, a plurality of cell structures have differences in partition wall thickness, pore properties, and the like. Therefore, there is a problem that carrying of a catalyst component on all the cell structures under the wash-coat conditions set up on the basis of partition wall thickness and the like of the arbitrarily selected cell structure is prone to cause variance in amount of the catalyst component carried.

It is considered that variance in amount of the catalyst component carried can be avoided by making partition wall thickness and the like of all the cell structures the same. However, an extrusion molding die used to form a ceramic raw material into a honeycomb structure gradually wears down as the number of extrusion molding increases. Therefore, partition wall thickness of the resultant cell structure tends to gradually increase as the number of extrusion molding increases. Since it is impossible to completely eliminate wear of an extrusion molding die, difference in partition wall thickness of the cell structures obtained cannot be avoided as a matter of fact.

SUMMARY OF THE INVENTION

The present invention has been made in view of the problems of the prior art and aims to provide a method for manufacturing a cell structure, the method being capable of suppressing excessive use of a catalyst component to reduce production costs and uniformalizing the amount of a catalyst component carried on the structures.

As a result of the intensive study, in order to achieve the above aim, they found out that dry mass of a cell structure has a correlation with the amount of a catalyst component carried by a wash-coat method and that the above aim can be achieved by carrying out machining on the basis of the correlation, which led to the completion of the present invention.

That is, according to the present invention, there is provided the following method for manufacturing a cell structure.

[1] A method for manufacturing cell structures having a plurality of cells divided by porous partition walls and extending from one end face to the other end face to function as fluid passages, wherein dry mass of each of a plurality of honeycomb-shaped cell structure precursors is measured, and at least one end face of each of the cell structure precursors is subjected to machining according to the dry mass measured to obtain a plurality of cell structures having a uniform dry mass.

[2] A method for manufacturing cell structures according to the above [1], wherein the machining is cutting, grinding, electro-discharge machining, ultrasonic machining, or beam machining.

[3] A method for manufacturing cell structures according to the above [1] or [2], wherein the cell structure is used as a catalyst carrier.

[4] A method for manufacturing cell structures according to any one of the above [1] to [3], wherein, after the machining, one end portion of each of predetermined cells of the cells is plugged with a plugging material on at least one end face of each of a plurality of the cell structure precursors to obtain the cell structures having a uniform dry mass.

[5] A method for manufacturing cell structures according to any one of the above [1] to [3], wherein, after one end portion of each of predetermined cells of the cells is plugged with a plugging material on at least one end face of each of the cell structure precursors, dry mass of each of the cell structure precursors is measured.

According to a method for manufacturing a cell structure of the present invention, there can be manufactured cell structures having a uniform amount of a catalyst component carried as well as being capable of reducing production costs by suppressing excessive use of a catalyst component.

DESCRIPTION OF REFERENCE NUMERALS

1: cell structure, 2: partition wall, 3: cell, 5a: one end face, 5b: the other end face, 10: cell structure precursor

DETAILED DESCRIPTION OF THE INVENTION

A best mode for carrying out the present invention will hereinbelow be described. However, the present invention is not limited to the following mode, and it should be understood that one having a change, an improvement, or the like, suitably applied to the following mode on the basis of general knowledge of those skilled in the art is also within the scope of the present invention.

An embodiment of a method for manufacturing cell structures of the present invention is a method for manufacturing cell structures having a plurality of cells divided by porous partition walls and extending from one end face to the other end face to function as fluid passages, wherein dry mass of each of a plurality of honeycomb-shaped cell structure precursors is measured, and at least one end face of each of the cell structure precursors is subjected to machining according to the dry mass measured to obtain a plurality of cell structures having a uniform dry mass. The details will hereinbelow be described.

Figure 9:
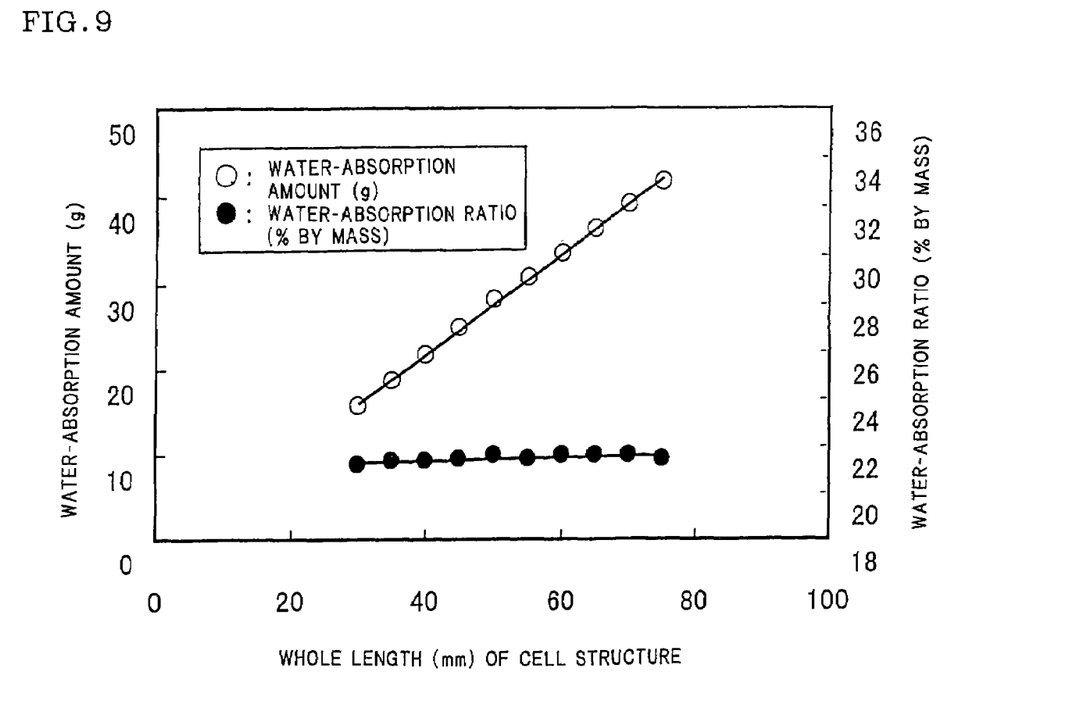
FIG. 9 is a graph where water-absorption amount and water-absorption ratio of a plurality of cell structures are plotted with respect to the whole length.

In a method for manufacturing cell structures of the present invention, the cell structure having a honeycomb structure is characterized by having the same cross-sectional shape (like Japanese "Kintaro candy") in the longitudinal direction. That is, since water-absorption amount of a cell structure is directly proportional to length of the cell structure, it is possible to control the water-absorption amount freely by adjusting the length. FIG. 9 is a graph where water-absorption amount and water-absorption ratio of a plurality of cell structures are plotted with respect to the whole length. The cell structures shown in FIG. 9 have an outer diameter of 105 mm and the same cell structure and are made of the same material (cordierite). In addition, they were obtained by extrusion molding in a short period of time in a concentrated manner with the same raw material batch. Since these cell structures were obtained by extrusion molding in a short period of time in a concentrated manner, it can be considered that they have the equal partition wall thickness practically. As shown in FIG. 9, the cell structures have a fixed water-absorption ratio regardless of their whole lengths. On the other hand, it can be understood that water-absorption amount of the cell structure is proportional to the whole length of the cell structure. A method for manufacturing a cell structure of the present invention makes use of such a characteristic that the water-absorption amount of the cell structure is proportional to the whole length of the cell structure.

Figure 1:
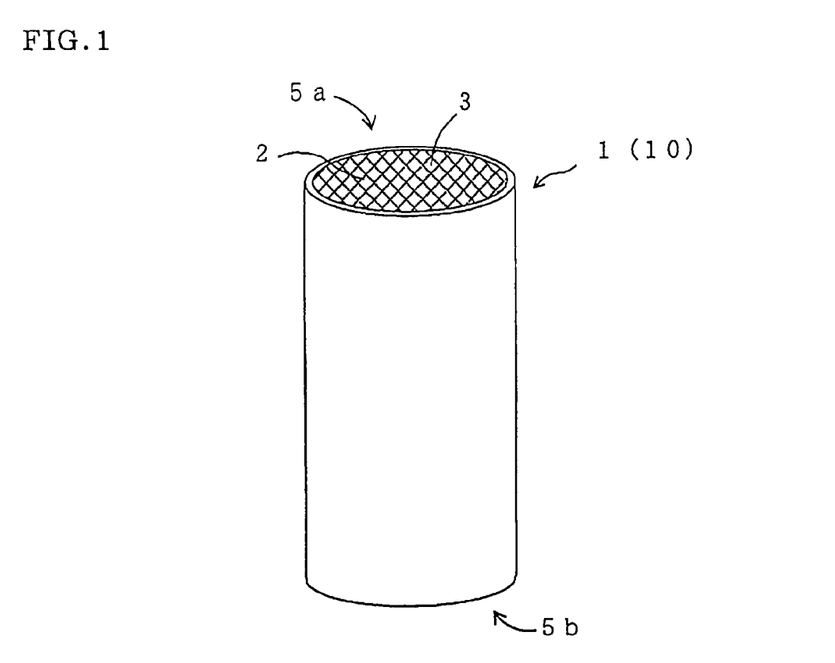
FIG. 1 is a perspective view schematically showing an example of a cell structure (cell structure precursor).

FIG. 1 is a perspective view schematically showing an example of a cell structure (cell structure precursor). The cell structure 1 is a so-called honeycomb-shaped structure provided with a plurality of cells 3 and extending from one end face 5a to the other end face 5b. The cells 3 are formed by being divided by porous partition walls 2.

Figure 2:
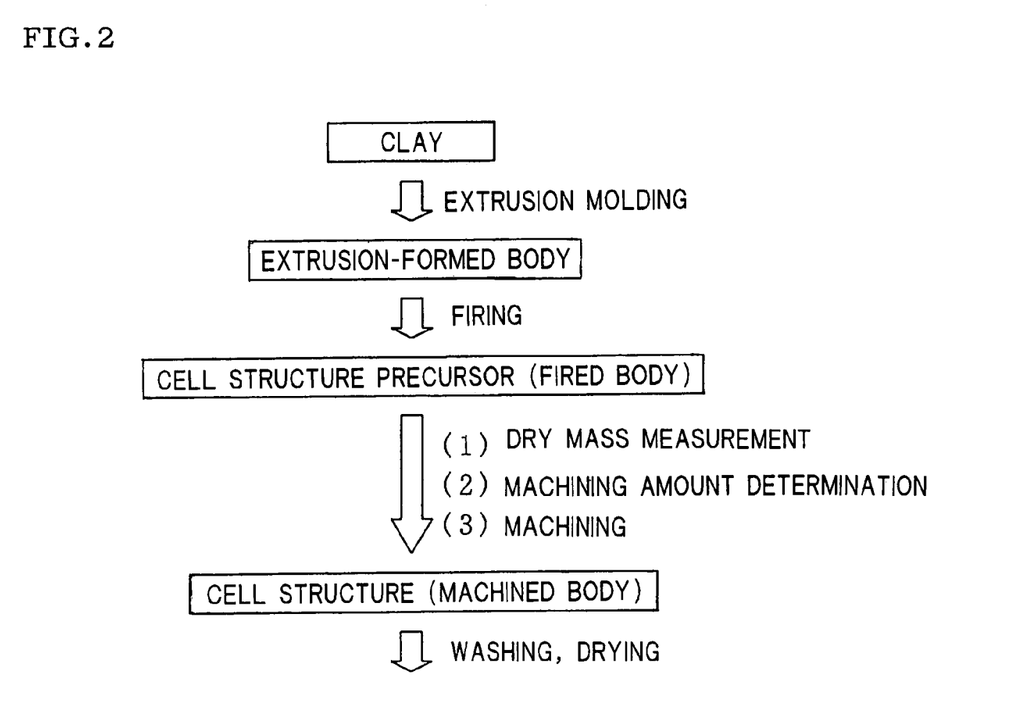
FIG. 2 is a flow chart showing an embodiment of a method for manufacturing a cell structure of the present invention.

FIG. 2 is a flow chart showing an embodiment of a method for manufacturing a cell structure of the present invention. In a method for manufacturing a cell structure of the present embodiment, dry mass of each of a plurality of cell structure precursors is measured. The cell structure precursor 10 is a fired body manufactured by, for example, subjecting an extrusion-formed honeycomb-shaped body (unfired body) obtained by extrusion-molding clay containing a ceramic raw material to firing or the like (see FIG. 1).

The clay can be prepared by, for example, mixing water, a binder, a surfactant, and the like, with a cordierite-forming raw material containing talc, kaolin, and alumina as the main raw materials to prepare a mixture, and mixing and kneading the mixture. After the clay is extruded to have a cylindrical shape with a kneader, the clay is further subjected to extrusion molding with an extrusion-forming apparatus to obtain an extrusion-formed honeycomb-shaped body (unfired body) having partition walls defining a plurality of cells functioning as fluid passages and an outer wall formed integrally with the partition walls. The unfired body obtained in this manner is dried and then cut to have a predetermined length to obtain a dried body. The dried body is fired to obtain a honeycomb-shaped cell structure precursor 10.

If firing and the like is performed after end portions on one side of predetermined cells are alternately plugged with a plugging material on both the end faces of the dried body, a honeycomb-shaped cell structure precursor having plugged portions can be obtained. Incidentally, an outer wall portion may be formed by applying a ceramic coat material after the outer peripheral wall and the partition walls for about 1 to 3 cells from the outermost periphery are removed by grinding.

Though the cell structure precursor 10 is generally in a dry state just after firing, a drying treatment may be performed if necessary. A plurality of cell structure precursors 10 in a dry state are prepared, and mass of each of them is measured. Next, at least one end face of each of the cell structure precursors 10 is subjected to machining according to the dry mass measured to obtain a machined cell structure 1. More specifically, the amount of machining is determined so that all the cell structure precursors 10 may have the same mass according to dry mass of each of the cell structure precursors 10 to subject one end face 5a and/or the other end face 5b to machining. Incidentally, by plugging end portions on one side of the cells 3 with a plugging material on at least one end face (5a, 5b) of the cell structure precursor 10 after machining, a cell structure having plugged portions can be obtained.

Examples of machining an end face of the cell structure precursor 10 include cutting using an end mill, a cutting tool, or the like, grinding using a grinding stone or the like, electro-discharge machining, ultrasonic machining, and beam machining using laser beams. For example, a portion including one end face 5a of each of the cell structure precursors 10 is removed by such machining so that all the cell structure precursors 10 may have the same mass. Incidentally, the cell structure 1 obtained in this manner may be subjected to a treatment such as washing and drying as necessary.

Even in cell structure precursors manufactured according to the same conditions, there is a variance in dry mass generally. This is supposed to be due to gradual increase or the like of partition wall thickness according to gradual wear of an extrusion molding die used for extrusion molding in accordance with increase in the number of extrusion molding.

In a method for manufacturing cell structures of the present embodiment, by utilizing the finding that dry mass of a cell structure has a correlation with the amount of a catalyst component carried by a wash-coat method, predetermined machining is performed so that a plurality of cell structure precursors have the same dry mass. Therefore, according to a method for manufacturing cell structures of the present embodiment, cell structures which can have a uniform amount of a catalyst component carried by, for example, a wash-coat method can be manufactured. In addition, since excessive use of a catalyst component can be suppressed by using the cell structures manufactured in this manner, production costs of a catalyst body for purifying automobile exhaust gas etc. can be reduced.

Figure 3:
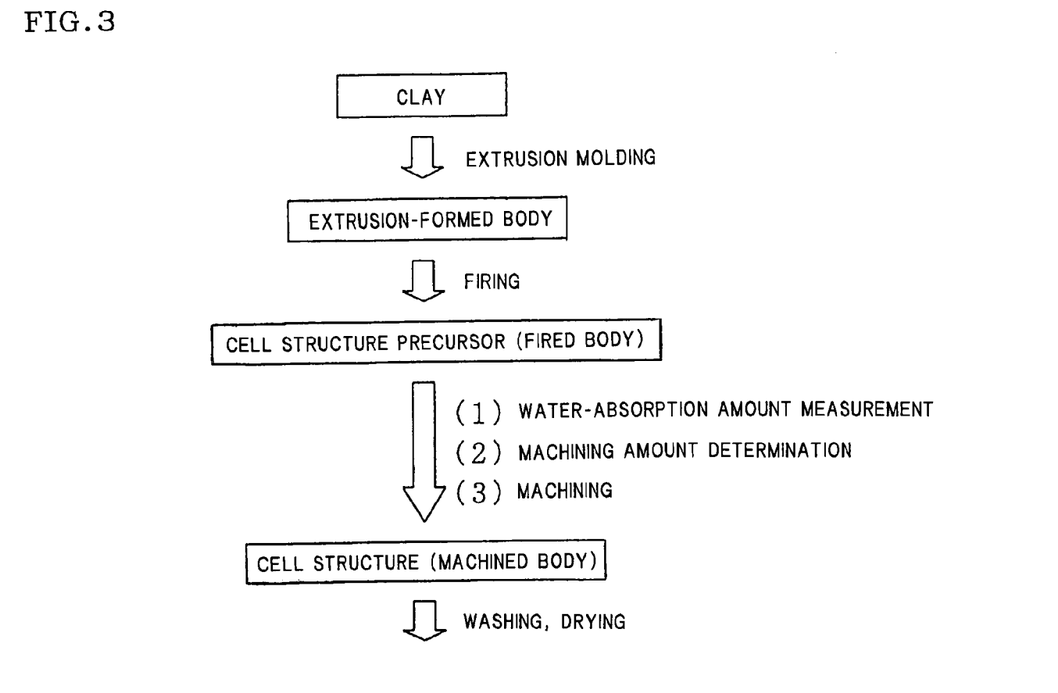
FIG. 3 is a flow chart showing an embodiment of a method for manufacturing another cell structure.

Next, an embodiment of a method for manufacturing another cell structure will be described. FIG. 3 is a flow chart showing an embodiment of a method for manufacturing another cell structure. In a method for manufacturing a cell structure of the present embodiment, water-absorption ratio of each of a plurality of cell structure precursor is measured. The cell structure precursor 10 is a fired body manufactured by, for example, subjecting an extrusion-formed honeycomb shaped body (unfired body) obtained by extrusion-molding clay containing a ceramic raw material to firing or the like (see FIG. 1) in the same manner as in the case of the above-mentioned method for manufacturing a cell structure of the present invention.

A plurality of cell structure precursors 10 subjected to a drying treatment as necessary are prepared, and water-absorption amount of each of them is measured. Next, according to each water-absorption ratio, at least one end face of each of the cell structure precursors 10 is machined to obtain machined cell structures 1. More specifically, the amount of machining is determined so that all the cell structure precursors 10 may have the same water-absorption amount according to the water-absorption amount of each of the cell structure precursors 10 to subject one end face 5a and/or the other end face 5b to machining.

Examples of machining an end face of the cell structure precursor 10 include cutting using an end mill, a cutting tool, or the like, grinding using a grinding stone or the like, electro-discharge machining, ultrasonic machining, and beam machining using laser beams like the case of the above-mentioned method for manufacturing a cell structure of the present invention. For example, a portion including one end face 5a of each of the cell structure precursors 10 is removed by such machining so that all the cell structure precursors 10 may have the same water-absorption amount. Incidentally, the cell structure 1 obtained in this manner may be subjected to a treatment such as washing and drying as necessary.

In a method for manufacturing cell structures of the present embodiment, by utilizing the finding that water-absorption amount of a cell structure has a correlation with the amount of a catalyst component carried by a wash-coat method, predetermined machining is performed so that a plurality of cell structure precursors have the same water-absorption ratio. Therefore, according to a method for manufacturing cell structures of the present embodiment, cell structures which can have a uniform amount of a catalyst component carried by, for example, a wash-coat method can be manufactured. In addition, since excessive use of a catalyst component can be suppressed by using the cell structures manufactured in this manner, production costs of a catalyst body for purifying automobile exhaust gas etc. can be reduced.

The water-absorption amount can be measured, for example, according to the following procedure. In the first place, liquid is filled in advance into cells 3 (passages) and pores in the partition walls 2 of a cell structure precursor 10 to be measured for water-absorption amount. Though there is no particular limitation on kind of liquid used, water is generally used. In order to fill the cells 3 and the pores in the partition walls 2 with the liquid, the cell structure precursor 10 may be immersed in the liquid. However, it is also preferable to fill the liquid by suction or under pressurized conditions according to pore properties or the like of the cell structure precursor.

The liquid is filled in the cells 3 and the pores in the partition walls 2, and, after a predetermined time, surplus liquid adhering to the inside of the cells 3 (passages) is discharged. The surplus liquid may be discharged by allowing air shower to blow against it, or circulating air compulsorily circulated in the cells 3 besides leaving the cell structure precursor 10 for a predetermined time after being taken out from the liquid. After discharging surplus liquid, mass of the cell structure precursor 10 in a liquid-absorbing state (mass after absorbing water) is measured. The water-absorption amount and the water-absorption ratio can be calculated according to the following formulae (1) and (2) from the mass after absorbing water measured above and the mass of the cell structure precursor in a dry state (dry mass) before absorbing water.

$$\text{Water-absorption amount }(g) = \text{mass after absorbing water }(g) - \text{dry mass }(g) \quad (1)$$

$$\text{Water-absorption ratio }(\%) = [\text{water-absorption amount }(g)/\text{dry mass }(g)] \times 100 \quad (2)$$

A method for manufacturing cell structures of the present embodiment is applied to various kinds of carrier-constituting materials to exhibit the effects. Therefore, though there is no particular limitation on a material for the cell structure (and the cell structure precursor), ceramic, metal, or the like may be specifically employed. More specifically, preferable examples of the material constituting the cell structure (and the cell structure precursor) include oxide ceramic materials such as cordierite, mullite, alumina, zirconia, titania, spinel, zirconium phosphate, aluminum titanate, and Ge-cordierite; non-oxide ceramic materials such as SiC and SiN; and metal materials such as Fe—Cr—Al alloy. Of these, it is preferable to use an oxide ceramic, which is prone to be subjected to corrosion due to alkali metal or alkali earth metal, and it is particularly preferable to use cordierite, which is widely used in the field of a catalyst for purifying automobile exhaust gas. It is also preferable to use a mixed-type or composite-type material of plural kinds of materials. Suitable examples of the material include a material where a mullite particle or a SiC particle is bonded to cordierite (particularly, a material containing 10% by mass or more of cordierite).

The cell structure may have an arbitrary cell shape such as a circle, a polygon, and a corrugation. Incidentally, as a cell structure of a carrier for a $NO_x$ adsorber catalyst, a hexagonal cell tends to be employed nowadays in order to uniformalize coat thickness of a catalyst layer other than a conventional triangular or rectangular cell. In a method for manufacturing cell structures of the present embodiment, a triangle, a rectangle, a hexagon, or the like, may be preferably employed as a cell shape of the cell structure. An external shape of the cell structure may be formed in a predetermined shape (e.g., cylindrical shape) suitable for the internal shape of the exhaust gas system where the cell structure is disposed. Further, it is also preferable to have a hybrid cell structure where an octagon and a rectangle are combined. Such a hybrid cell structure is particularly suitable in the case of using the cell structure as a filter.

Though a cell density of the cell structure is not particularly limited, the cell density is preferably within the range from 6 to 1500 cells/inch$^2$ (0.9 to 233 cells/cm$^2$) as a catalyst carrier. In addition, the cell structure preferably has a partition wall thickness of 20 to 2000 μm.

According to a method for manufacturing a cell structure of the present invention, a variance in length is prone to be caused among cell structures. Therefore, when a cell structure is canned in a converter container, it is sometimes necessary to adjust the size or the like of the converter container upon canning with grasping length of each cell structure. It is also possible to mark each cell structure with information about length of each cell structure supposing such a case, and that the information is read before canning to adjust the length.

According to a method for manufacturing a cell structure of the present invention, a cell structure having a uniform amount of catalyst component carried thereon can easily be manufactured. Therefore, a cell structure manufactured by a method for manufacturing a cell structure of the present invention is suitable for a catalyst carrier for mainly manufacturing a catalyst body for purifying automobile exhaust gas etc.

EXAMPLES

The present invention will hereinbelow be described specifically on the basis of Examples. However, the present invention is by no means limited to these Examples.

Example 1

Figure 4:
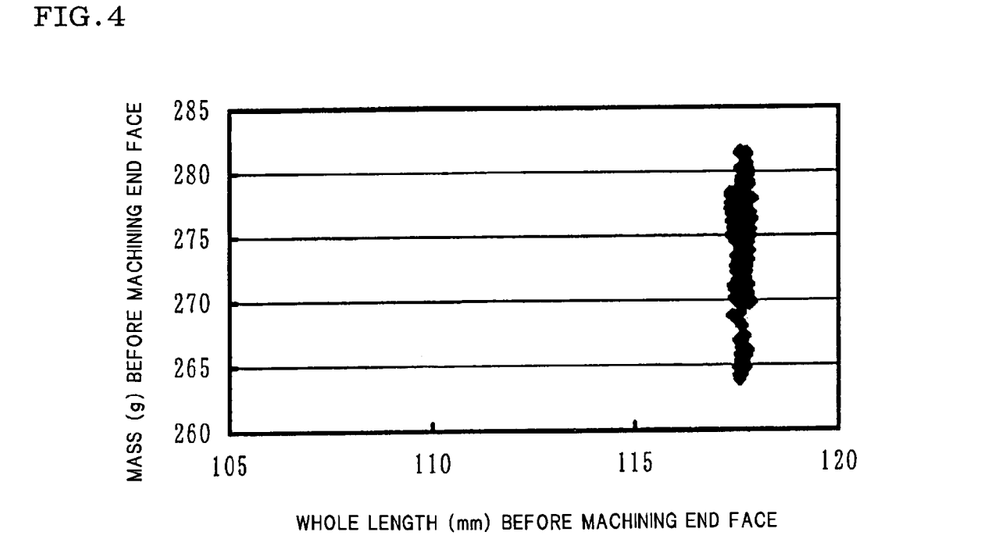
FIG. 4 is a graph where mass (g) of a cell structure manufactured in Example 1 before machining an end face is plotted with respect to the whole length (mm) before machining an end face.
Figure 5:
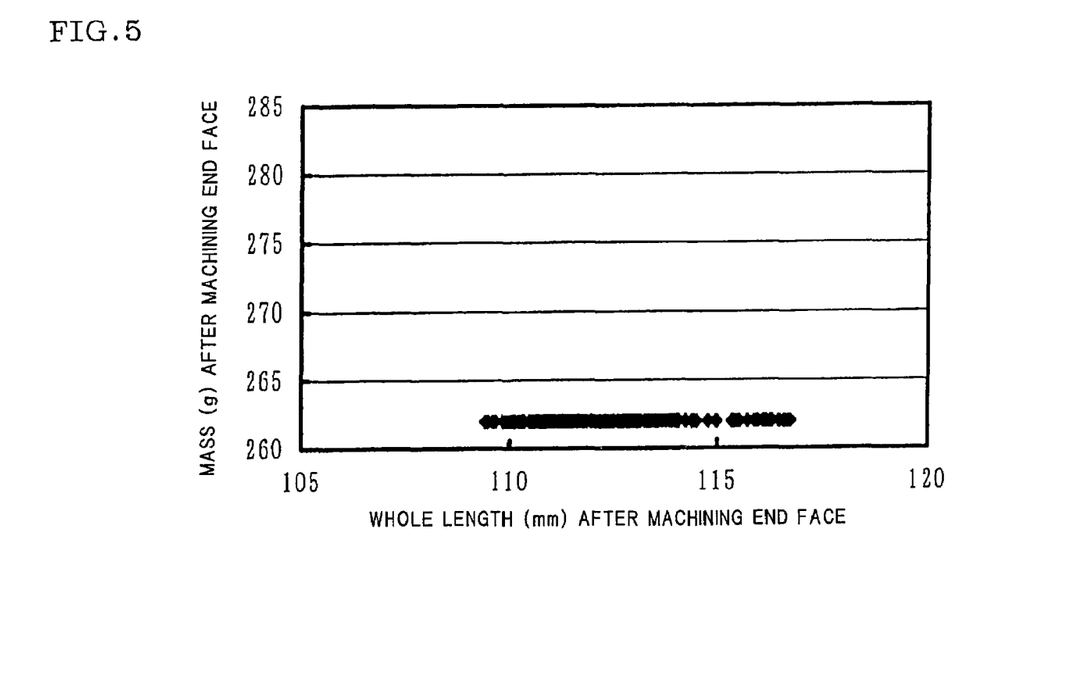
FIG. 5 is a graph where mass (g) of a cell structure manufactured in Example 1 after machining an end face is plotted with respect to the whole length (mm) after machining an end face.

There were sampled 287 cell structures at random from an arbitrary lot of cell structures [external diameter: 110.0 mm$\phi$×whole length: 117.61 mm (both are average values), and cell density: 900 cpsi] constituted by cordierite and having a shape as shown in FIG. 1. Each of the sampled cell structures was accurately measured for the whole length and the dry mass. The maximum and minimum values of the whole length and the maximum, minimum, and average values of the dry mass of the cell structures measured are shown in Table 1. Mass per unit length [cell structure dry mass (g)/whole length (mm)] of each of the cell structure was calculated, and length for machining an end face of each cell structure was calculated so that the cell structure has a weight of 262 g, which is slightly lighter than the minimum dry mass (263.9 g) among the lot. One end face of each of the cell structures was removed by grinding in the direction of cell passage length for the length for machining calculated above to obtain 287 cell structures. Incidentally, a graph where mass (g) before machining an end face is plotted with respect to the whole length (mm) before machining an end face is shown in FIG. 4. In addition, a graph where mass (g) after machining an end face is plotted with respect to the whole length (mm) after machining an end face is shown in FIG. 5.

Example 2

Figure 6:
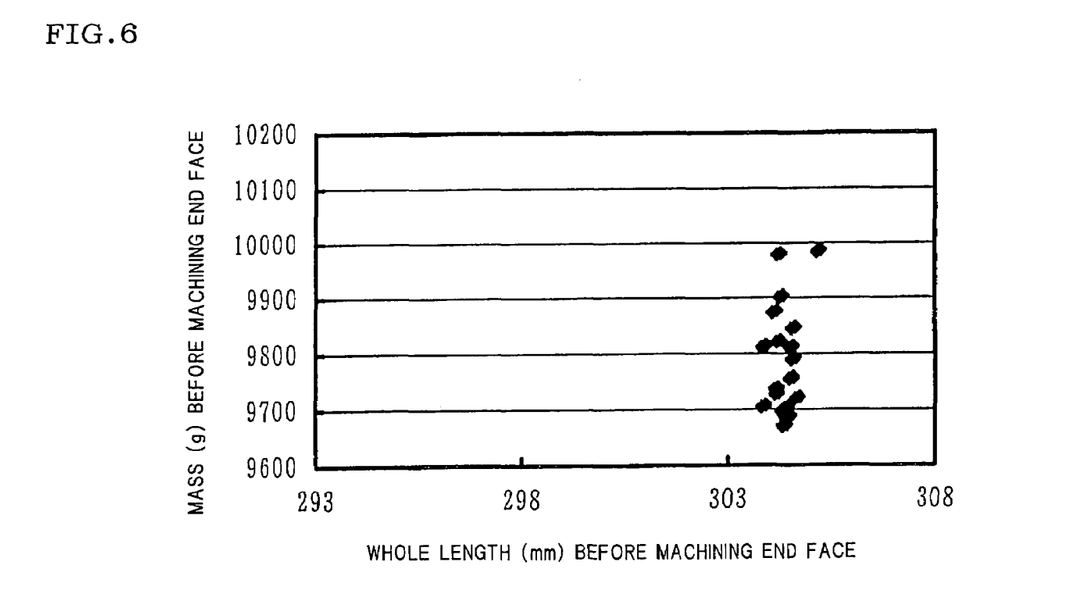
FIG. 6 is a graph where mass (g) of a cell structure manufactured in Example 2 before machining an end face is plotted with respect to the whole length (mm) before machining an end face.
Figure 7:
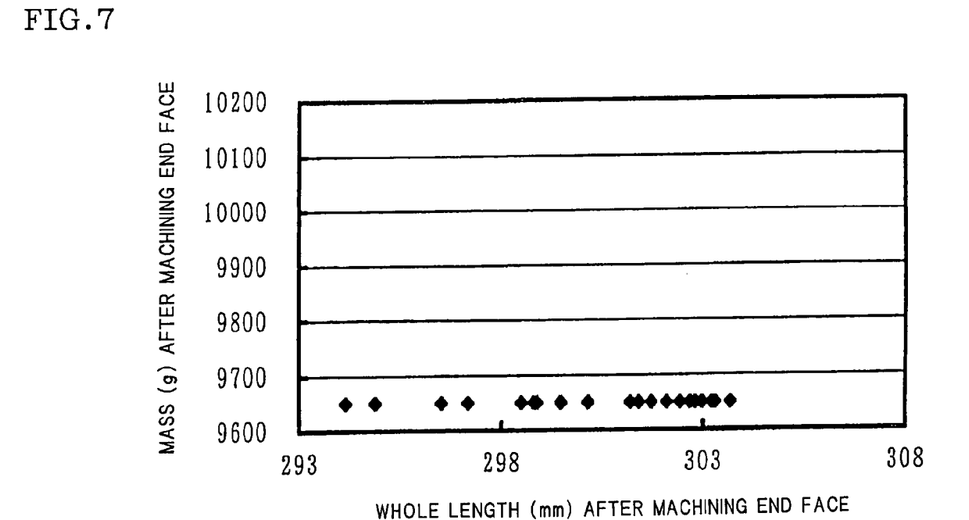
FIG. 7 is a graph where mass (g) of a cell structure manufactured in Example 2 after machining an end face is plotted with respect to the whole length (mm) after machining an end face.

After end portions on one side of the predetermined cells were alternately plugged with a plugging material on both the end faces, the cell structure was fired to obtain a fired body. After an outer peripheral portion of the obtained fired body is removed by grinding, a ceramic coat material is applied to the outer periphery to form an outer wall portion to obtain a cordierite cylindrical cell structure [cross-sectional shape of cell: rectangle, partition wall thickness: 0.3 mm, cell density: 200 cpsi (31 cells/cm$^2$), external diameter: 304 mm$\phi$×whole length: 305 mm (both are average values)]. There were sampled 20 cell structures at random from an arbitrary lot, and each of the sampled cell structures was accurately measured for the whole length and the dry mass. One end face of each of the cell structures was removed by grinding in the direction of cell passage length for the predetermined length to obtain 20 cell structures. A graph where mass (g) before machining an end face is plotted with respect to the whole length (mm) before machining an end face is shown in FIG. 6. In addition, a graph where mass (g) after machining an end face is plotted with respect to the whole length (mm) after machining an end face is shown in FIG. 7.

Example 3

Figure 8:
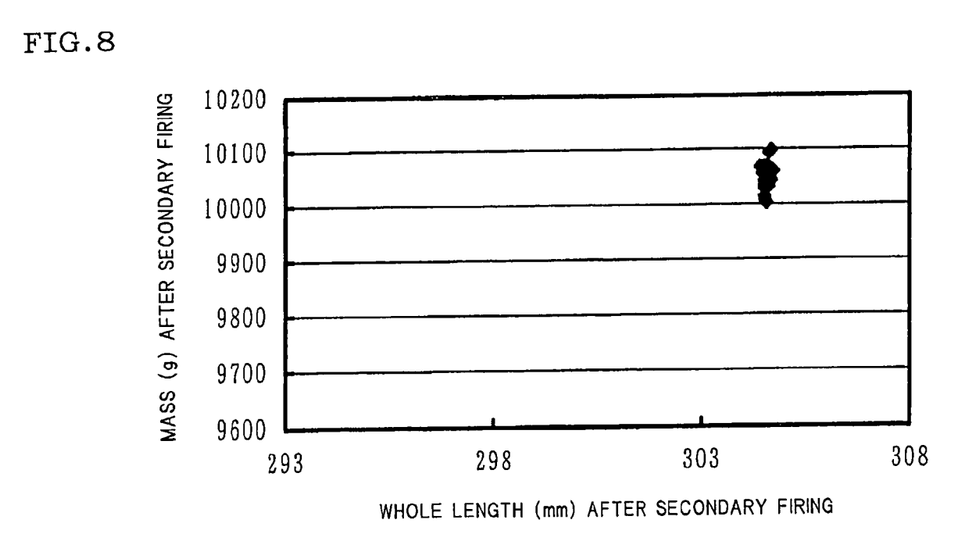
FIG. 8 is a graph where mass (g) of a cell structure manufactured in Example 3 is plotted with respect to the whole length (mm) after secondary firing.

Cell structures constituted by cordierite and having a shape as shown in FIG. 1 [cross-sectional shape of cell: rectangle, partition wall thickness: 0.3 mm, cell density: 200 cpsi (31 cells/cm$^2$), external diameter: 304 mm$\phi$×whole length: 305 mm (both are average values)] were manufactured by firing (primary firing). From an arbitrary lot of the cell structures manufactured above, 30 cell structures were sampled at random, and each of the sampled cell structures was accurately measured for the whole length and the dry mass. One end face of each of the cell structures was removed by grinding in the direction of cell passage length for the predetermined length to obtain 30 cell structures. After end portions on one side of the predetermined cells were alternately plugged with a plugging material on both the end faces of each of the cell structures, the cell structures were fired (secondary firing) to obtain fired bodies. After an outer peripheral portion of each of the obtained fired bodies was removed by grinding, a ceramic coat material was applied to the outer periphery to form an outer wall portion to obtain 30 cordierite cylindrical cell structures (secondary fired bodies). A graph where mass (g) of the secondary fired bodies manufactured is plotted with respect to the whole length (mm) is shown in FIG. 8.

TABLE 1

|  | Whole length (mm) | Dry mass of cell structure (g) | Dry mass/whole length of cell structure (g/mm) | Length for machining end face (mm) | Whole length after machining end face (mm) |
|---|---|---|---|---|---|
| Maximum value | 117.9 | 281.5 | 2.4 | 8.1 | 109.8 |
| Minimum value | 117.3 | 263.9 | 2.2 | 0.8 | 116.5 |
| Average value (n = 287) | 117.61 | 274.52 | 2.33 | 5.34 | 112.27 |
| Standard deviation $\sigma$ | 0.11 | 3.80 | 0.03 | 1.56 | 1.57 |

According to a method for manufacturing a cell structure of the present invention, a cell structure suitable for a catalyst carrier for manufacturing a catalyst body for purifying automobile exhaust gas etc. can be manufactured simply at low costs.

What is claimed is:

1. A method for manufacturing cell structures having a plurality of cells divided by porous partition walls and extending from one end face to the other end face to function as fluid passages, wherein dry mass of each of a plurality of honeycomb-shaped cell structure precursors is measured, and at least one end face of each of the cell structure precursors is subjected to machining according to the dry mass measured to obtain a plurality of cell structures having a uniform dry mass.

2. A method for manufacturing cell structures according to claim 1, wherein the machining is cutting, grinding, electro-discharge machining, ultrasonic machining, or beam machining.

3. A method for manufacturing cell structures according to claim 1, wherein the cell structure is used as a catalyst carrier.

4. A method for manufacturing cell structures according to claim 1, wherein, after the machining, one end portion of each of predetermined cells of the cells is plugged with a plugging material on at least one end face of each of a plurality of the cell structure precursors to obtain the cell structures having a uniform dry mass.

5. A method for manufacturing cell structures according to claim 1, wherein, after one end portion of each of predetermined cells of the cells is plugged with a plugging material on at least one end face of each of the cell structure precursors, dry mass of each of the cell structure precursors is measured.

6. A method for manufacturing cell structures each having two end faces and a plurality of cells divided by porous partition walls and extending from one end face to the other end face to function as fluid passages, comprising:

measuring dry mass of each of a plurality of honeycomb-shaped cell structure precursors;

obtaining a uniform dry mass among a plurality of cell structures by machining at least one end face of each of the cell structure precursors according to the measured dry mass; and obtaining a uniform amount of catalyst using the plurality of cell structures having the uniform dry mass.

\* \* \* \* \*